United States Patent
Kawabata

(10) Patent No.: US 12,063,006 B2
(45) Date of Patent: Aug. 13, 2024

(54) MOTOR CONTROL DEVICE

(71) Applicant: DENSO CORPORATION, Kariya (JP)

(72) Inventor: Tsuyoshi Kawabata, Kariya (JP)

(73) Assignee: DENSO CORPORATION, Kariya (JP)

(*) Notice: Subject to any disclaimer, the term of this patent is extended or adjusted under 35 U.S.C. 154(b) by 152 days.

(21) Appl. No.: 17/956,083

(22) Filed: Sep. 29, 2022

(65) Prior Publication Data

US 2023/0023273 A1    Jan. 26, 2023

Related U.S. Application Data

(63) Continuation of application No. PCT/JP2021/011031, filed on Mar. 18, 2021.

(30) Foreign Application Priority Data

Apr. 1, 2020 (JP) ................. 2020-066013

(51) Int. Cl.
  H02P 29/64  (2016.01)
  H02K 7/14   (2006.01)
  H02K 11/25  (2016.01)
  H02K 11/33  (2016.01)

(52) U.S. Cl.
  CPC ........... H02P 29/64 (2016.02); H02K 7/14 (2013.01); H02K 11/25 (2016.01); H02K 11/33 (2016.01)

(58) Field of Classification Search
  CPC .......... H02P 29/64; H02K 7/14; H02K 11/25; H02K 11/33
  USPC .................................. 318/473, 471, 445
  See application file for complete search history.

(56) References Cited

U.S. PATENT DOCUMENTS

| | | | |
|---|---|---|---|
| 10,328,803 B2 * | 6/2019 | Komatsu | ............ B60L 15/2009 |
| 2014/0139172 A1 | 5/2014 | Yamada | |
| 2015/0160625 A1 | 6/2015 | Yoshida et al. | |
| 2017/0234424 A1 | 8/2017 | Yamamoto | |
| 2019/0190411 A1 | 6/2019 | Kamio | |

FOREIGN PATENT DOCUMENTS

| | | |
|---|---|---|
| JP | H6-131047 | 5/1994 |
| JP | 2008-206323 | 9/2008 |
| JP | 2021-044903 | 3/2021 |

* cited by examiner

*Primary Examiner* — David Luo
(74) *Attorney, Agent, or Firm* — Nixon & Vanderhye P.C.

(57) ABSTRACT

A motor control device controls a driving of a motor having a motor winding. The motor control device includes a motor control unit and a parameter setting unit. The motor control unit controls the driving of the motor. The parameter setting unit sets a control parameter related to a driving control of the motor such that at least one of a motor torque and a motor speed is variable according to a system temperature.

9 Claims, 14 Drawing Sheets

| ELECTRICAL CONDUCTION PATTERN | 0 | 1 | 2 | 3 | 4 | 5 | 6 | 7 | 8 | 9 | 10 | 11 |
|---|---|---|---|---|---|---|---|---|---|---|---|---|
| U PHASE | ○ | ○ | ○ | ○ | ○ | ○ | ○ |  |  |  |  | ○ |
| V PHASE |  |  |  | ○ | ○ | ○ | ○ | ○ | ○ | ○ | ○ |  |
| W PHASE | ○ | ○ | ○ |  |  |  |  | ○ | ○ | ○ | ○ | ○ |

MOTOR CONTROL DEVICE

CROSS REFERENCE TO RELATED APPLICATIONS

The present application is a continuation application of International Patent Application No. PCT/JP2021/011031 filed on Mar. 18, 2021, which designated the U.S. and claims the benefit of priority from Japanese Patent Application No. 2020-066013 filed on Apr. 1, 2020. The entire disclosures of all of the above applications are incorporated herein by reference.

TECHNICAL FIELD

The present disclosure relates to a motor control device.

BACKGROUND

A shift range switch device has been proposed for switching a shift range by controlling driving of a motor. For example, as an energization method for keeping the number of energization phases constant during abutting control, the motor is rotationally driven by sequentially switching the energization phase of the motor in a one-phase energization method or a two-phase energization method.

SUMMARY

The present disclosure provides a motor control device that controls a driving of a motor having a motor winding. The motor control device includes a motor control unit and a parameter setting unit. The motor control unit controls the driving of the motor. The parameter setting unit sets a control parameter related to a driving control of the motor such that at least one of a motor torque and a motor speed is variable according to a system temperature. As a result, it is possible to avoid stopping the motor due to insufficient torque, and to appropriately continue driving of the motor.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
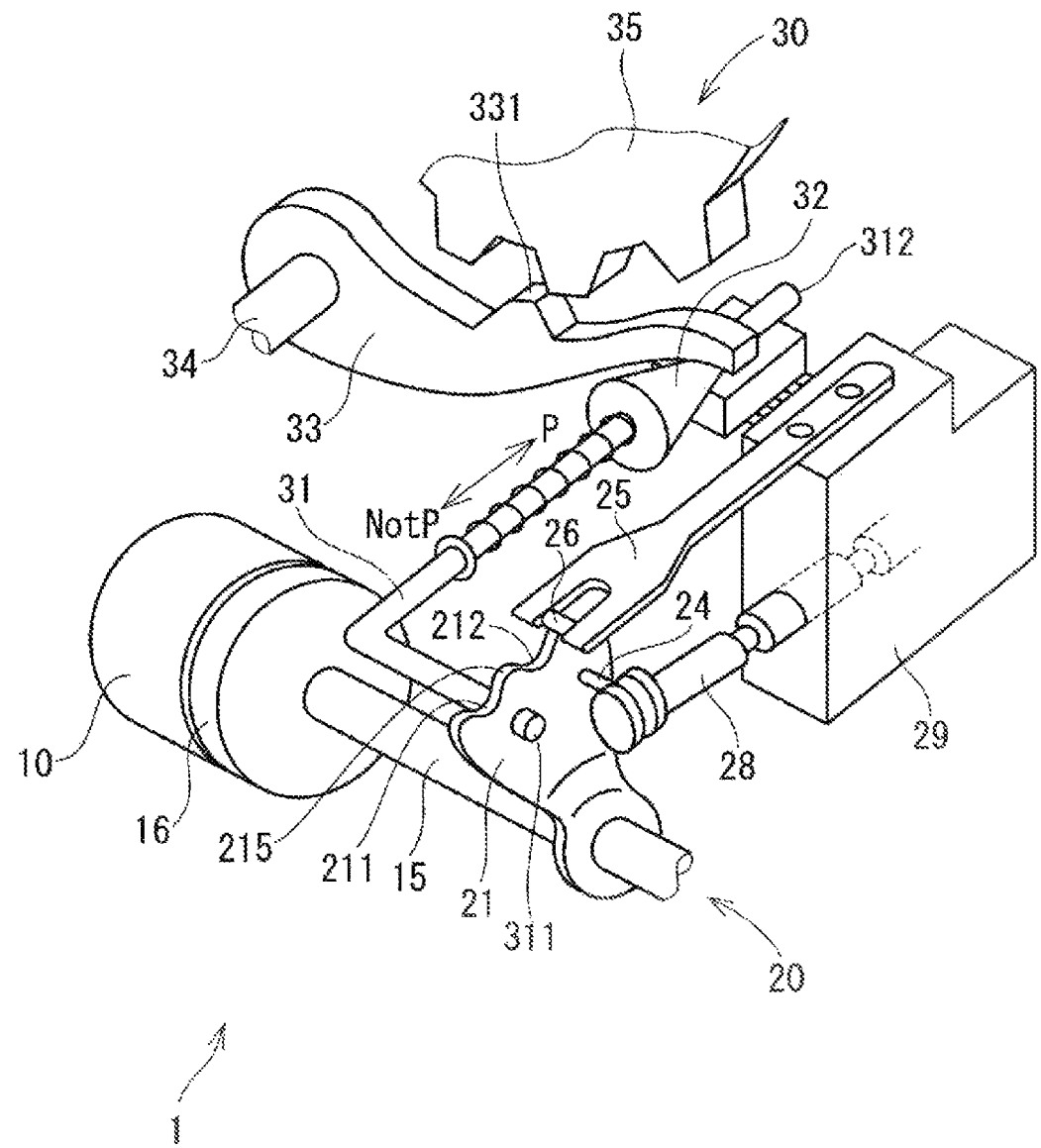
FIG. 1 is a perspective view showing a shift-by-wire system according to a first embodiment.

For example, when a motor is driven by one-phase energization or two-phase energization, torque is more likely to drop near an angle at which the energization phase is switched, compared to a case where energization is performed by repeating one-phase and two-phase energization. When the motor stops due to influence of load torque at the angle position where the torque drops, there is a possibility that the motor will not start again due to insufficient torque. The present disclosure provides a motor control device capable of appropriately continuing driving of a motor.

An exemplary embodiment of the present disclosure provides a motor control device that controls a driving of a motor having a motor winding. The motor control device includes a motor control unit and a parameter setting unit. The motor control unit controls the driving of the motor. The parameter setting unit sets a control parameter related to a driving control of the motor such that at least one of a motor torque and a motor speed is variable according to a system temperature. As a result, it is possible to avoid stopping the motor due to insufficient torque, and to appropriately continue driving of the motor. In the exemplary embodiment of the present disclosure, it is possible to avoid stopping the motor due to insufficient torque, and to appropriately continue driving of the motor.

Hereinafter, a motor control device will be described with reference to the drawings. Hereinafter, in a plurality of embodiments, substantially the same components are denoted by the same reference numerals, and descriptions of the same components will be omitted.

First Embodiment

Figure 2:
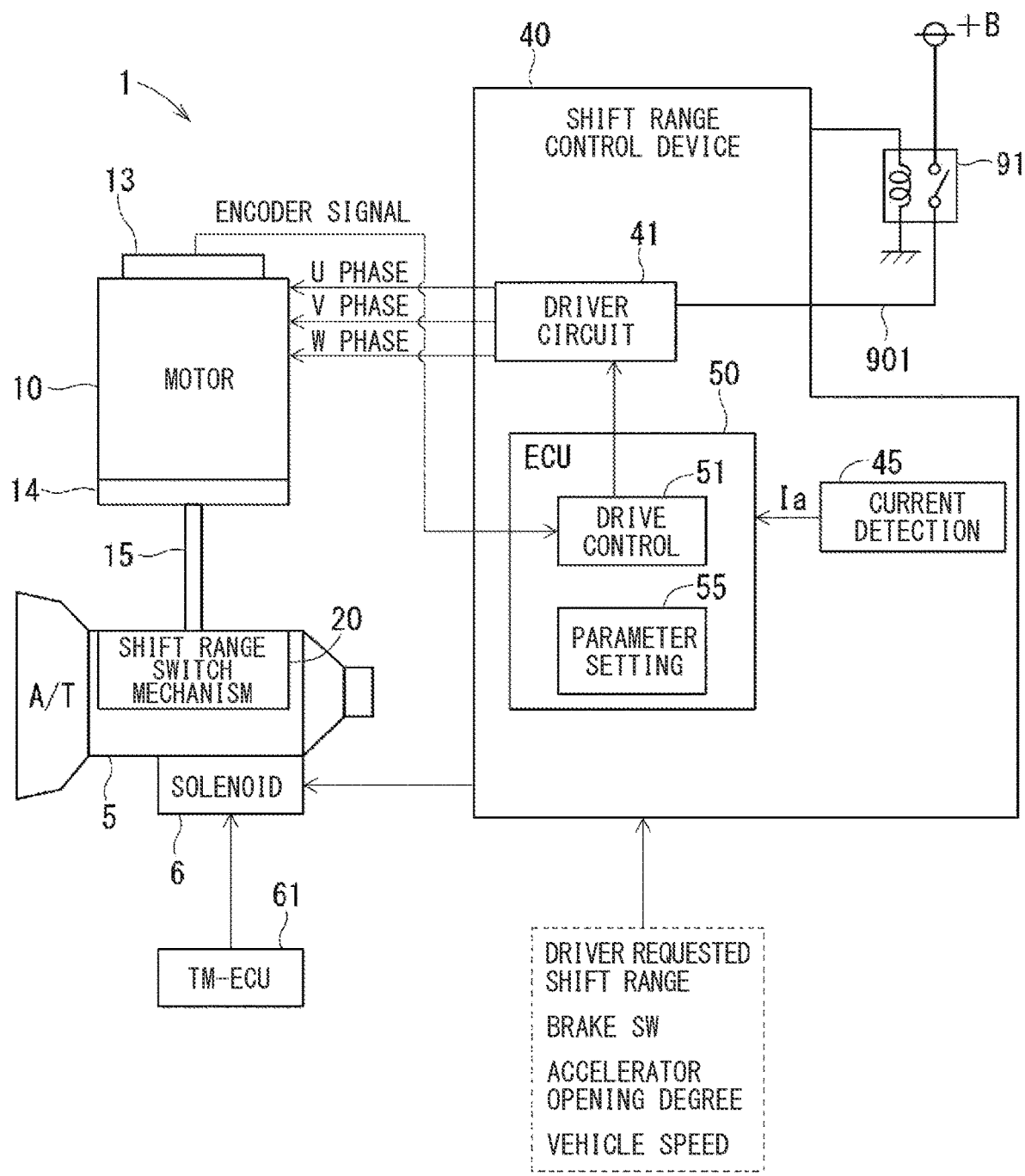
FIG. 2 is a schematic configuration diagram showing the shift-by-wire system according to the first embodiment.

The first embodiment is shown in FIGS. 1 to 9. As shown in FIGS. 1 and 2, a shift-by-wire system 1 includes a motor 10, a shift range switching mechanism 20, a parking lock mechanism 30, a shift range control device 40 as a motor control device, and the like.

The motor 10 rotates while receiving an electric power from a battery 90 mounted on a vehicle (not shown), and functions as a driving source of the shift range switching mechanism 20. The motor 10 is, for example, a switched reluctance motor. The motor 10 includes a motor winding 11 wound around a salient pole of a stator (not shown). The motor winding 11 has a U-phase winding 111, a V-phase winding 112 and a W-phase winding 113 (see FIG. 3). A rotor (not shown) is rotated by controlling the energization to the motor winding 11.

As shown in FIG. 2, an encoder 13, which is a rotational position sensor, detects the rotational position of the rotor (not shown) of the motor 10. The encoder 13 is, for example, a magnetic rotary encoder, and includes a magnet that rotates integrally with the rotor, a Hall IC for magnetic detection, and the like. The encoder 13 outputs an encoder signal, which is an A phase and B phase pulse signal, at each predetermined angle in synchronization with the rotation of the rotor. The speed reducer 14 is provided between a motor shaft of the motor 10 and the output shaft 15 to decelerate the rotation of the motor 10 and output the decelerated rotation to the output shaft 15. As a result, the rotation of the motor 10 is transmitted to the shift range switching mechanism 20. In the present embodiment, an output shaft sensor that detects the angle of the output shaft 15 is omitted.

As shown in FIG. 1, the shift range switching mechanism 20 includes a detent plate 21, a detent spring 25 and the like. The shift range switching mechanism 20 transmits the rotational drive force output from the speed reducer 14 to a manual valve 28 and the parking lock mechanism 30.

The detent plate 21 is fixed to the output shaft 15 and driven by the motor 10. The detent plate 21 has a pin 24 protruding in parallel with the output shaft 15. The pin 24 is connected to the manual valve 28. When the detent plate 21 is driven by the motor 10, the manual valve 28 reciprocates in an axial direction. In other words, the shift range switching mechanism 20 converts a rotational motion of the motor 10 into a linear motion and transmits the linear motion to the manual valve 28. The manual valve 28 is provided in a valve body 29. When the manual valve 28 reciprocates in the axial direction, a hydraulic supply path to a hydraulic clutch (not shown) is switched, and an engagement state of the hydraulic clutch is switched. In this way, the shift range is switched.

The detent plate 21 is provided with two valley portions 211 and 212 at portions close to the detent spring 25. In the present embodiment, the valley portion 211 corresponds to a P range, and the valley portion 212 corresponds to a NotP range, which is a range other than the P range.

The detent spring 25 is an elastically deformable plate-like member, and is provided with a detent roller 26 at a tip of the detent spring 25. The detent spring 25 urges the detent roller 26 toward the center of rotation of the detent plate 21. When a rotational force equal to or greater than a predetermined force is applied to the detent plate 21, the detent spring 25 is elastically deformed, and the detent roller 26 moves between the valley portions 211 and 212. When the detent roller 26 is fitted into any one of the valley portions 211 and 212, the swinging motion of the detent plate 21 is regulated, the axial position of the manual valve 28 and the state of the parking lock mechanism 30 are determined, and the shift range of an automatic transmission 5 is fixed.

The parking lock mechanism 30 includes a parking rod 31, a conical member 32, a parking lock pole 33, a shaft part 34 and a parking gear 35. The parking rod 31 is formed in a substantially L-shape, and one end 311 is fixed to the detent plate 21. The other end 312 of the parking rod 31 is provided with the conical member 32. The conical member 32 is formed to reduce in diameter toward the other end 312. When the detent plate 21 rotates in the direction in which the detent roller 26 fits into the valley portion 211 corresponding to the P range, the conical member 32 moves in the direction of the arrow P.

The parking lock pole 33 comes into contact with a conical surface of the conical member 32 and is provided so as to be swingable around the shaft part 34. On the parking gear 35 side of the parking lock pole 33, a protrusion 331 that can mesh with the parking gear 35 is provided. When the conical member 32 moves in the direction of the arrow P due to the rotation of the detent plate 21, the parking lock pole 33 is pushed up and the protrusion 331 and the parking gear 35 mesh with each other. On the other hand, when the conical member 32 moves in the direction of the arrow NotP, the meshing between the protrusion 331 and the parking gear 35 is released.

The parking gear 35 is provided to an axle (not shown) and is enabled to mesh with the protrusion 331 of the parking lock pole 33. When the parking gear 35 engages with the protrusion 331, the rotation of the axle is restricted. When the shift range is the NotP range, the parking gear 35 is not locked by the parking lock pole 33, and the rotation of the axle is not hindered by the parking lock mechanism 30. When the shift range is the P range, the parking gear 35 is locked by the parking lock pole 33 and the rotation of the axle is restricted.

Figure 3:
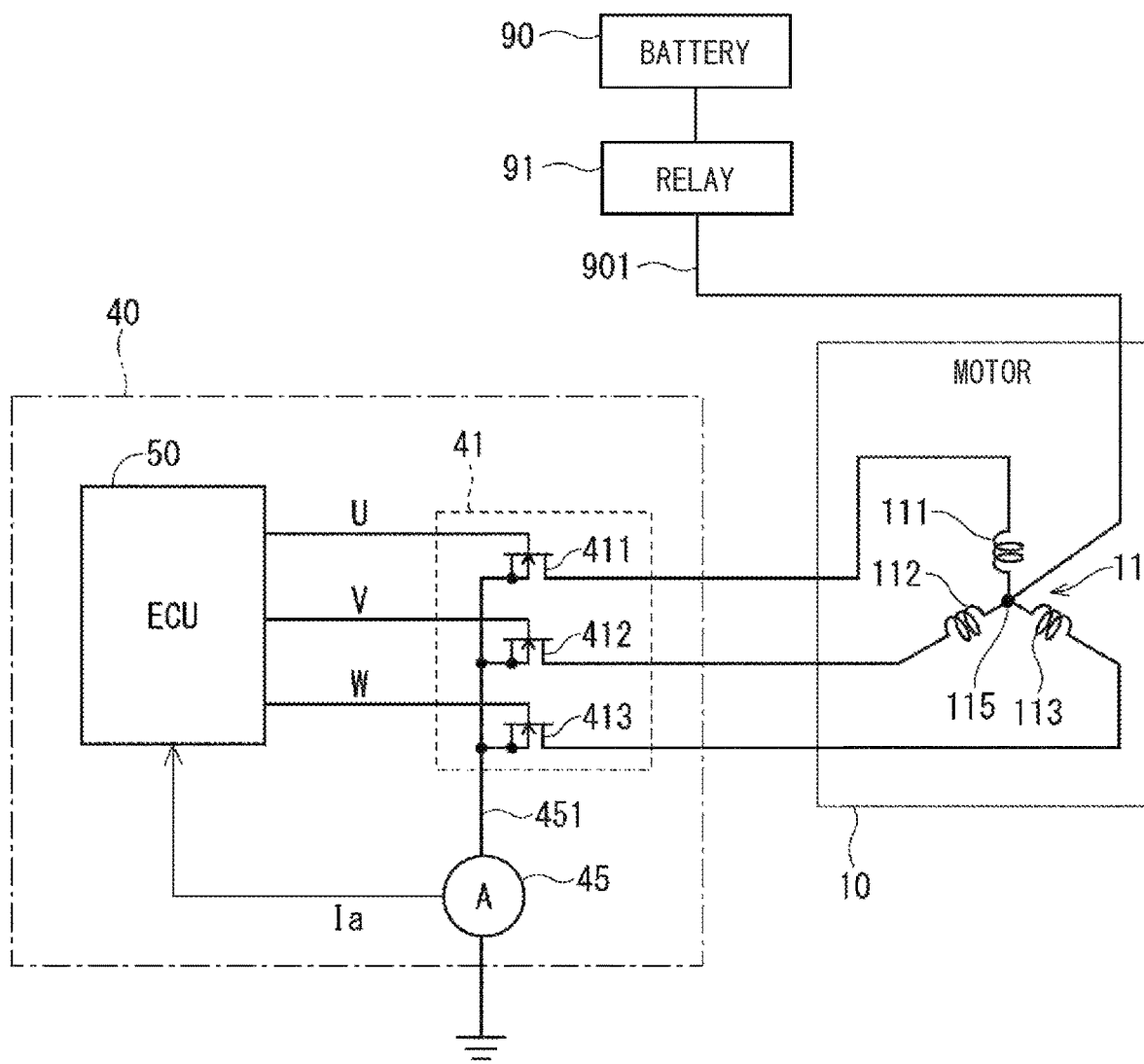
FIG. 3 is a circuit diagram showing a shift range control device according to the first embodiment.

As shown in FIGS. 2 and 3, the shift range control device 40 includes a drive circuit unit 41, a current detection unit 45, a shift-by-wire ECU 50, and the like. As shown in FIG. 3, the drive circuit unit 41 includes three switching elements 411, 412, 413. In the present embodiment, the drive circuit unit 41 is provided between the windings 111 to 113 of the respective phases and the ground. The switching elements 411 to 413 are provided corresponding to the windings 111 to 113 of the respective phase and switch the energization of the corresponding phases. The switching elements 411 to 413 of the present embodiment are MOSFETs, but may be IGBTs or the like.

The windings 111 to 113 of the motor winding 11 are connected by a connection portion 115. Power is supplied to the connection portion 115 from the battery 90 via a power supply line 901. The power supply line 901 is provided with a relay 91, and power is supplied to the wire connection 115 when the relay 91 is turned on. The current detection unit 45 is provided in the collective wiring 451 connecting the source of each of the switching elements 411 to 413 and the ground and detects a collective current Ia that is a sum of currents flowing through the windings 111 to 113.

The shift-by-wire ECU 50 internally includes a CPU, a ROM, a RAM, an I/O, a bus line for connecting those components, and the like (not shown). Each processing in the ECU 50 may be software processing by executing a program stored in advance in a tangible memory device (that is, a readable non-transitory tangible recording medium) such as the ROM by the CPU, or may be hardware processing by a dedicated electronic circuit. The same applies to the transmission ECU 61, the engine ECU 62, and the air conditioner ECU 63.

Figure 4:
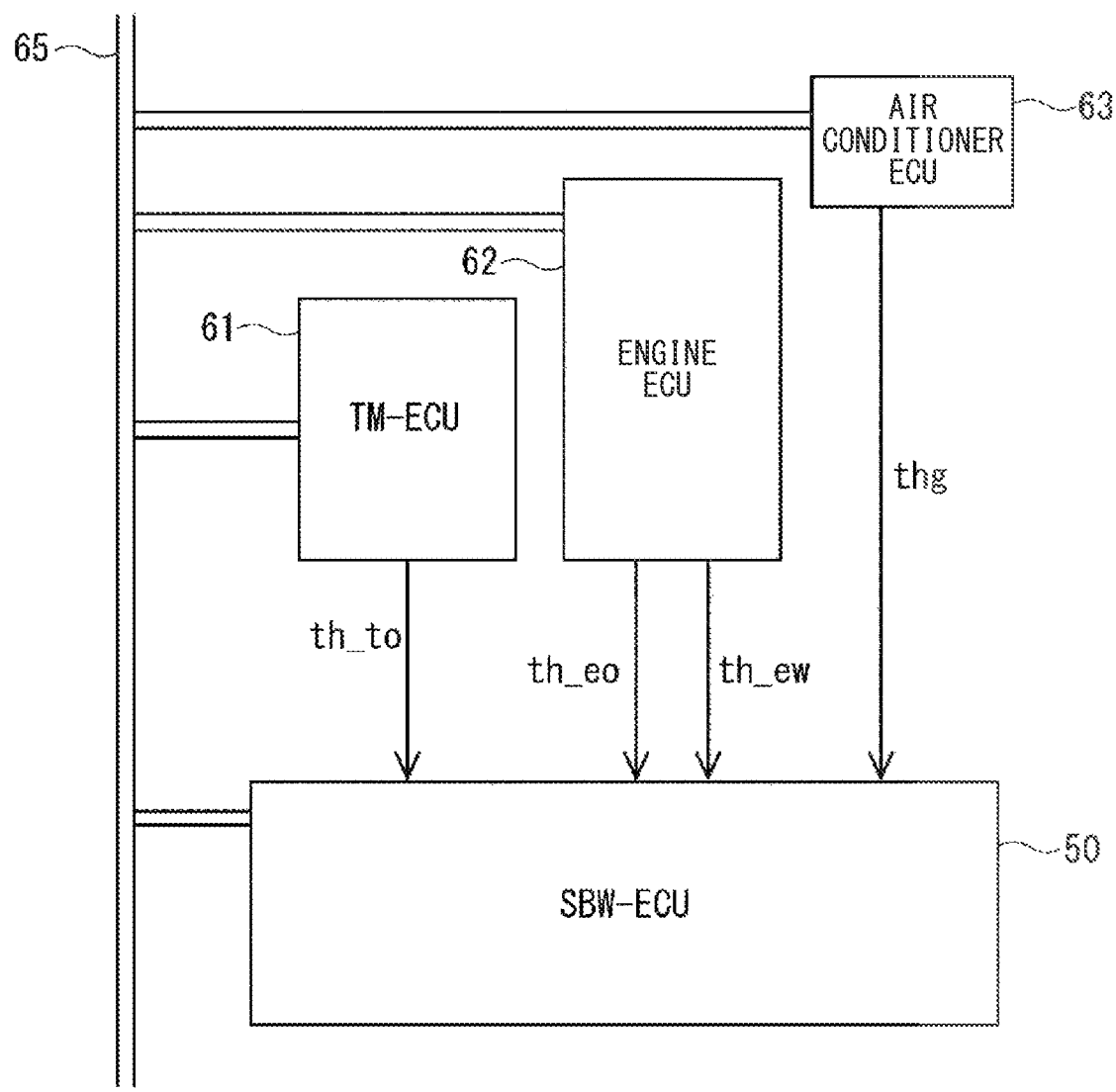
FIG. 4 is a block diagram showing an ECU according to the first embodiment.

As shown in FIG. 4, the shift-by-wire ECU 50 is provided so as to be able to communicate with the transmission ECU 61, the engine ECU 62, the air conditioner ECU 63, and the like via a vehicle communication network 65 such as a Controller Area Network (CAN). Hereinafter, the ECU 50 will be referred to as SBW-ECU 50 or simply ECU 50, and the transmission ECU 61 will be referred to as TM-ECU 61.

As shown in FIG. 2, the SBW-ECU 50 controls the switching of the shift range by controlling the drive of the motor 10 based on a driver-requested shift range, a signal from a brake switch, a vehicle speed, and the like. The TM-ECU 61 controls the drive of a shift hydraulic control solenoid 6 based on the vehicle speed, an accelerator opening degree, the driver-requested shift range, and the like. By controlling the shift hydraulic control solenoid 6, the shift stage is controlled. The number of the shift hydraulic control solenoids 6 is determined according to the number of shift stages or the like. Although the SBW-ECU 50 and the TM-ECU 61 are configured as separate ECUs in this embodiment, the SBW-ECU 50 and the TM-ECU 61 may be configured as a single ECU. Hereinafter, a drive control of the motor 10 will be mainly described.

The SBW-ECU 50 has a drive control unit 51, a parameter setting unit 55, and the like. The drive control unit 51 commands the energization phases based on an encoder count value Cen corresponding to the encoder signal from the encoder 13 and controls the energization of the motor winding 11. The encoder count value Cen is counted up or counted down for each edge detection of the encoder signal. In the present embodiment, the encoder count value Cen is counted up at the time of forward rotation and is counted down at the time of reverse rotation. Further, current limitation is performed so that the collective current Ia does not exceed a current limit value.

The parameter setting unit 55 acquires the transmission oil temperature thto from the TM-ECU 61, acquires the engine oil temperature theo and the engine cooling water temperature thew, acquires the outside temperature thg from the air conditioner ECU 62, and performs low temperature determination processing (see FIG. 4). Further, the parameter setting unit 55 sets parameters related to drive control of the motor 10 according to the determination result. Details of the low temperature determination processing and the parameter setting processing will be described later.

Figures 5A, 5B:
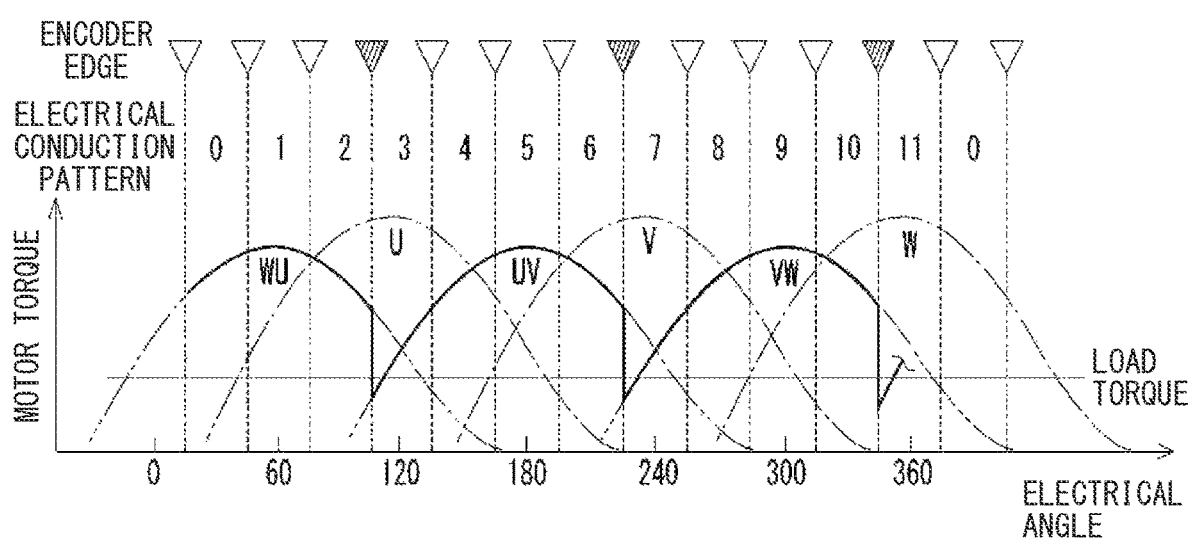
FIG. 5A is a diagram showing energization patterns and energization phases according to the first embodiment.
FIG. 5B is a diagram showing a relationship between an electrical angle and motor torque according to the first embodiment.

As shown in FIG. 5A, a relationship between an energization pattern number and energization phases is stored in a storage unit (not shown). The drive control unit 51 changes the energization pattern by +1 in the forward rotation and −1 in the reverse rotation every time the pulse edge of the encoder signal is detected. The motor 10 is rotated by switching the energization phases in accordance with the energization pattern. In FIG. 5A, the energization patterns P0 to P11 are set to one cycle corresponding to one electrical angle cycle, and phases energized in each energization pattern are indicated by circles. In the drawing, in order to avoid complication, symbol "P" indicating the pattern number is omitted, and only the number is described.

In the present embodiment, the motor 10 is rotated by repeating two-phase energization that energizes two phases of the windings 111 to 113 without using one-phase energization that energizes one phase of the windings 111 to 113. In FIG. 5B, the horizontal axis represents the electrical angle, the vertical axis represents the motor torque, and the motor torque corresponding to the energization phases for one cycle of the electrical angle is shown. The motor torque is described on the assumption that each phase current is constant. The generated torque at the time of one-phase energization is indicated by an alternate long and short dash line, the generated torque at the time of two-phase energization is indicated by an alternate long and two short dashes line, the encoder edge generation portion is indicated by a triangle, and the energization pattern is also indicated. In addition, hatching is applied to a portion where the energization phases are switched among the symbols indicating the encoder edge generation portions.

In the present embodiment, the WU phase is energized by turning on the switching elements 411 and 413 in the energization patterns P0 to P2 and P11, and when the encoder edge is detected in the energization pattern P2, the energization is switched to the UV phase by turning on the switching elements 411 and 412. In the energization patterns P3 to P6, the UV phase energization is continued. When the encoder edge is detected in the energization pattern P6, the switching elements 412, 413 are turned on to make switching to the VW phase energization. In the energization patterns P7 to P10, the VW phase energization is continued. When the encoder edge is detected in the energization pattern P10, the switching is made to the WU phase energization.

As shown by solid lines in FIG. 5B, the motor torque tends to drop near the angle at which the energization phase is switched. In particular, in a low temperature environment, the sliding resistance inside and outside the actuator increases, so that the motor torque further decreases. When the motor 10 stops at an angle at which the motor torque decreases, there is a possibility that the motor 10 cannot be restarted due to insufficient torque.

When the rotation speed of the motor 10 is high, it is highly probable that the motor 10 can pass through the torque drop region by inertia. On the other hand, when the rotation speed of the motor 10 is small, the motor 10 tends to stop due to a decrease in torque. In the present embodiment, for the detent roller 26, a wall portion (hereinafter referred to as "P wall") of the valley portion 211 opposite to the valley portion 212 is set as a drive limit position of the motor, and the P wall position is used as a reference position for learning. Note that a notP wall, which is a wall portion of the valley portion 212 opposite to the valley portion 211, may be set as the "drive limit position", and the notP wall position may be learned as the reference position. Here, when learning the reference position, the rotation speed of the motor 10 is suppressed in consideration of durability.

When the output shaft sensor is not provided as in the present embodiment, it cannot be determined in which of the valley portions 211 and 212 the detent roller 26 is located when the SBW-ECU 50 is activated. When the reference position learning is performed by a P wall contact, if the detent roller 26 is located in the valley portion 212, it is necessary to overcome the mountain portion 215 between the valley portions 211 and 212, and there is a possibility that the motor 10 may stop due to the detent load.

That is, when it is necessary to overcome the mountain portion 215 between the valley portions 211 and 212 in the reference position learning with the two-phase energization, and the increase in friction due to the low temperature in the low speed drive, there is a possibility that the motor 10 will stop in the mountain portion 215. Moreover, there is a possibility that the motor 10 cannot be restarted due to insufficient torque. The term "low speed" as used herein indicates a speed (for example, 500 [rpm] or less) in which the detent roller 26 cannot overcome the mountain portion 215 due to a drop in torque near the energization phase switching timing during two-phase energization by an increase in friction at a low temperature (for example, 0° C. or lower, preferably −20° C. or lower).

Therefore, the present embodiment causes the motor 10 not to stop by changing the control parameters such that the drive torque of the motor 10 is increased or the braking torque is decreased when the temperature is low.

Figure 6:
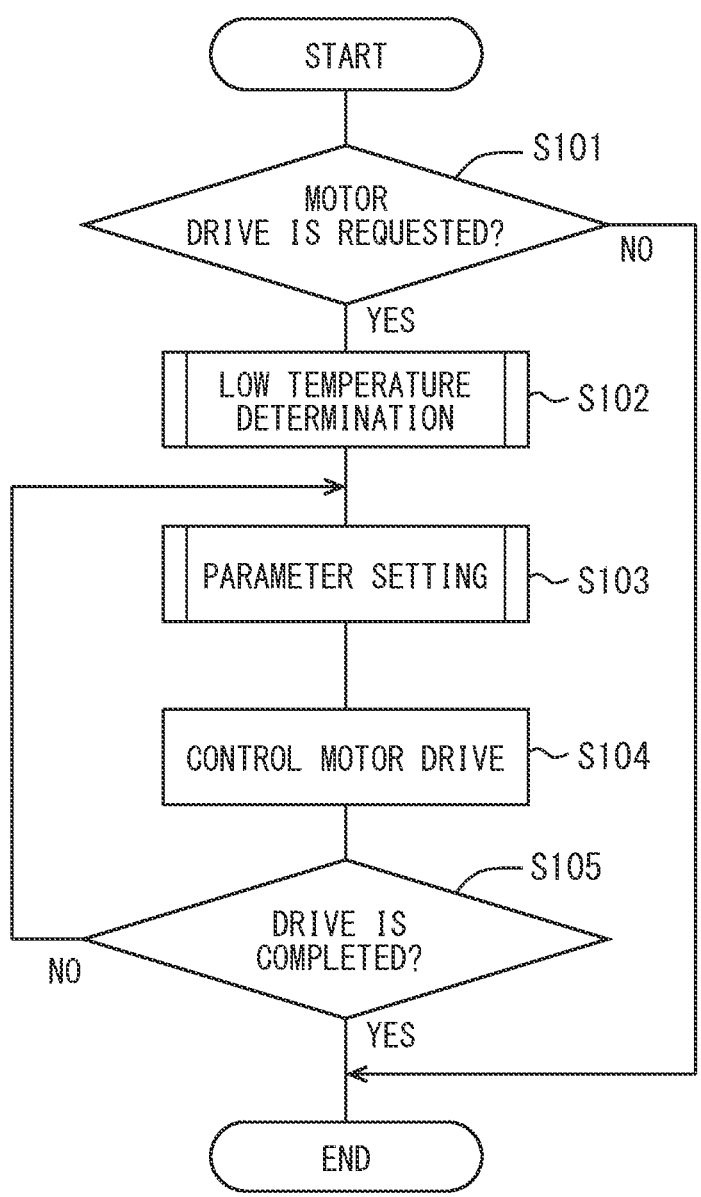
FIG. 6 is a flowchart showing motor drive processing according to the first embodiment.

The motor drive processing of the present embodiment will be described with reference to the flowchart of FIG. 6. This processing is performed during the reference position learning when the start switch of the vehicle is turned on. Hereinafter, "step" in step S101 is omitted, and is simply referred to as a symbol "S." This also applies to the other steps.

In S101, the ECU 50 determines whether or not there is a motor drive request. When the ECU 50 determines that there is no motor drive request (S101: NO), the process after S102 is skipped. When the ECU 50 determines that there is a motor drive request (S101: YES), the process proceeds to S102. In S102, the ECU 50 performs low temperature determination processing.

Figure 7:
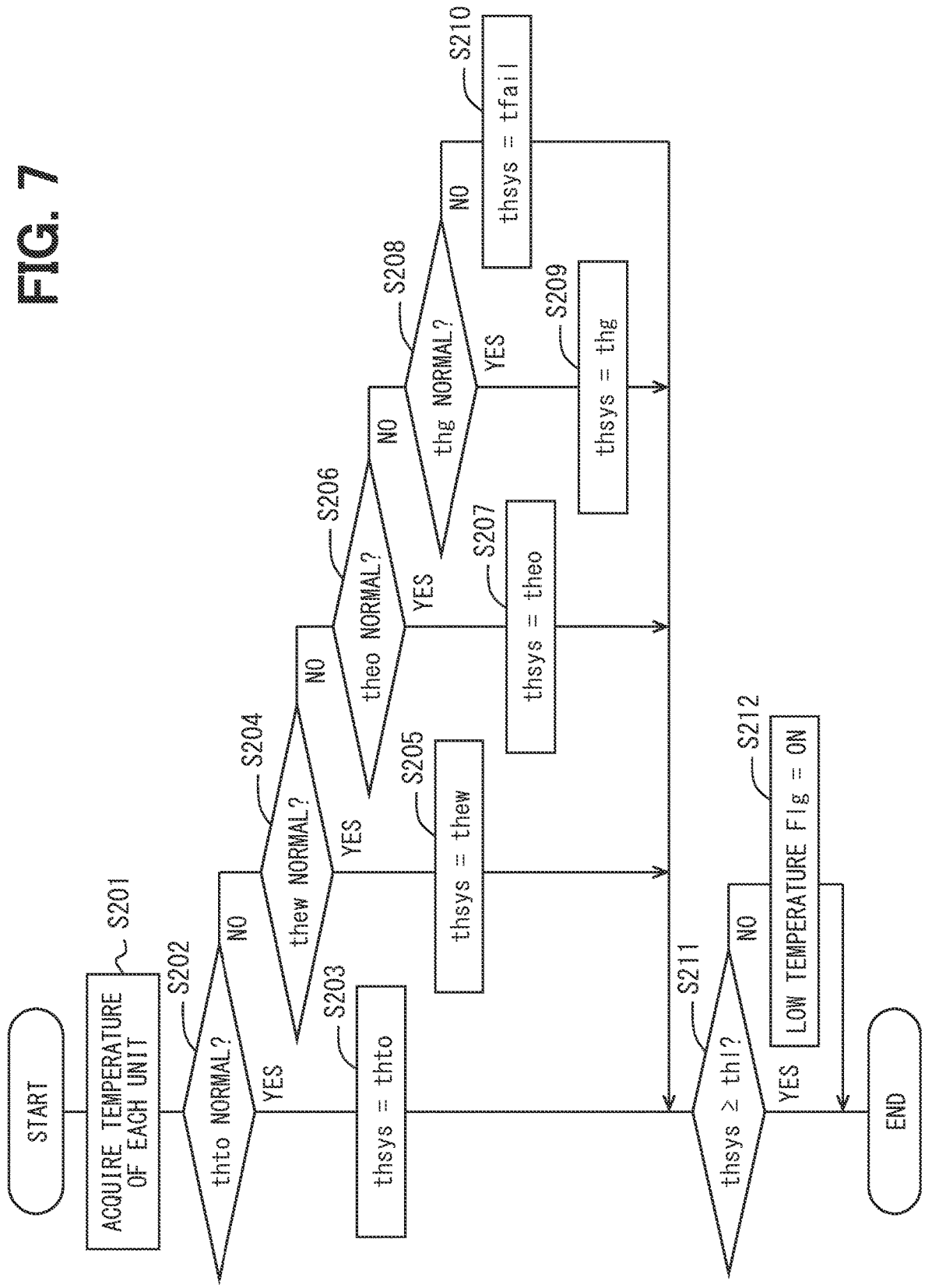
FIG. 7 is a flowchart showing low temperature determination processing in the first embodiment.
Figure 8:
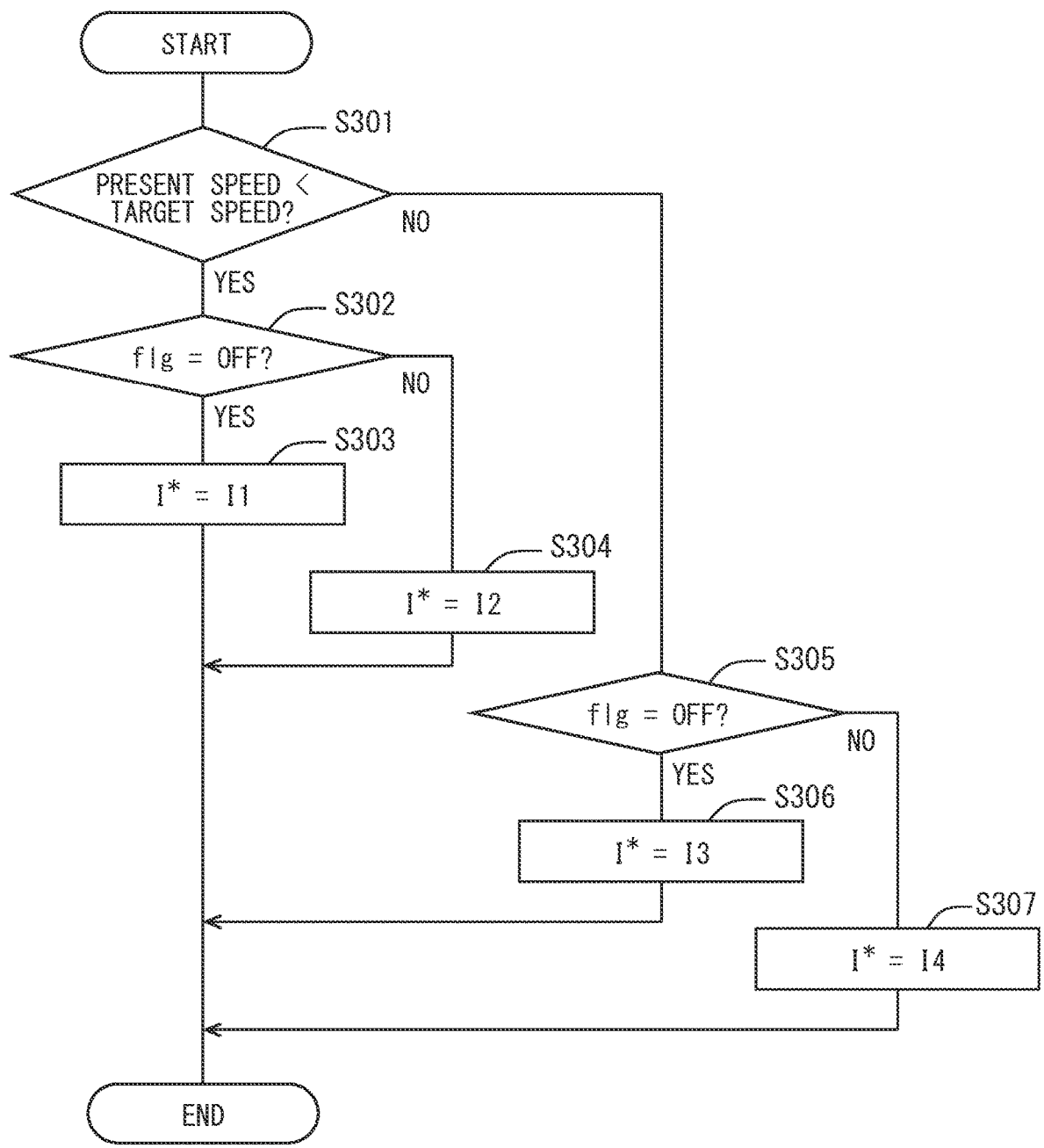
FIG. 8 is a flowchart showing parameter setting processing according to the first embodiment.

The low temperature determination processing will be described with reference to the flowchart of FIG. 7. In S201, the parameter setting unit 55 acquires the temperature of each unit from the ECUs 61 to 63. In S202, the parameter setting unit 55 determines whether or not the transmission oil temperature thto obtained from the TM-ECU 61 is normal. when the parameter setting unit 55 determines that the transmission oil temperature thto is normal (S202: YES), the process proceeds to S203 and sets a system temperature thsys to the transmission oil temperature thto. When the parameter setting unit 55 determines that the transmission oil temperature thto is not normal (S202: NO), the process proceeds to S204. Here, "the transmission oil temperature thto is not normal" includes a case where the acquired value is abnormal and a case where the temperature information cannot be acquired. The same is applied to other temperatures.

In S204, the parameter setting unit 55 determines whether or not the engine water temperature thew acquired from the engine ECU 62 is normal. When the parameter setting unit 55 determines that the engine water temperature thew is normal (S204: YES), the process proceeds to S205 and sets the system temperature thsys to the engine water temperature thtw. When the parameter setting unit 55 determines that the engine water temperature thew is not normal (S204: NO), the process proceeds to S206.

In S206, the parameter setting unit 55 determines whether or not the engine oil temperature theo acquired from the engine ECU 62 is normal. When the parameter setting unit 55 determines that the engine oil temperature theo is normal (S206: YES), the process proceeds to S207 and sets the system temperature thsys to the engine oil temperature theo. When the parameter setting unit 55 determines that the engine oil temperature theo is not normal (S206: NO), the process proceeds to S208.

In S208, the parameter setting unit 55 determines whether or not the outside temperature thg acquired from the air conditioner ECU 63 is normal. When the parameter setting unit 55 determines that the outside temperature thg is normal (S208: YES), the process proceeds to S209, and the system temperature thsys is set to the outside temperature thg. When the parameter setting unit 55 determines that the outside temperature thg is not normal (S208: NO), the process proceeds to S210 and sets the system temperature thsys to a failure temperature tfail. The fail temperature tfail is an arbitrary design value, and may be set to the worst condition or a standard temperature. In the processes of S202 to S210, the temperature at a location as close as possible to the shift-by-wire system 1 is selected as the system temperature thsys.

In S211, the parameter setting unit 55 determines whether or not the system temperature thsys is equal to or higher than a low temperature determination value thl. When the parameter setting unit 55 determines that the system temperature thsys is equal to or higher than the low temperature determination value thl (S211: YES), the process of S212 is skipped and a low temperature flag flg is not turned on. When the low temperature flag flg has been turned on, it is turned off. When the parameter setting unit 55 determines that the system temperature thsys is lower than the low temperature determination value thl (S211: NO), the process proceeds to S212 and turns on the low temperature flag flg. Hereinafter, the state in which the low temperature flag flg is on is referred to as "low temperature", and the state in which the low temperature flag is off is referred to as "normal temperature".

Returning to FIG. 6, in S103 following the low temperature determination processing (S102), the ECU 50 performs a parameter setting processing. The parameter setting processing will be described with reference to a flowchart of FIG. 8. The drive control unit 51 determines whether or not a motor speed SP of the motor 10 is smaller than a target speed SP*. When the drive control unit 51 determines that the motor speed SP is equal to or higher than the target speed SP* (S301: NO), the process proceeds to S305. When the drive control unit 51 determines that the motor speed SP is smaller than the target speed SP* (S301: YES), the process proceeds to S302. Here, it can be said that S302 is a step to be shifted when acceleration is requested, and S305 is a step to be shifted when deceleration is requested.

In S302, which a step to be shifted when acceleration is requested, the parameter setting unit 55 determines whether or not the low temperature flag flg is off. When the parameter setting unit 55 determines that the low temperature flag flg is off (S302: YES), that is, it is at normal temperature, the process proceeds to S303, and the target current I* is set to a normal temperature acceleration target value I1 (for example, 6.5 [A]). When the parameter setting unit 55 determines that the low temperature flag flg is on (S302: NO), the process proceeds to S304, and the target current I* is set to a low temperature acceleration target value I2 (for example, 7.5 [A]). The low temperature acceleration target value I2 is greater than the normal temperature acceleration target value I1. That is, it is satisfied that I1<I2.

In S305, which a step to be shifted when deceleration is requested, the parameter setting unit 55 determines whether or not the low temperature flag fig is off. When the parameter setting unit 55 determines that the low temperature flag fig is off (S305: YES), the process proceeds to S306, and the target current I* is set to a normal temperature deceleration target value I3 (for example, 6.5 [A]). When the parameter setting unit 55 determines that the low temperature flag fig is on (S305: NO), the process proceeds to S307, and the target current I* is set to a low temperature deceleration target value I4 (for example, 5.5 [A]). The low temperature deceleration target value I4 is smaller than the normal temperature deceleration target value I3. That is, it is satisfied that I3>I4. Further, the normal temperature acceleration target value I1 and the normal temperature deceleration target value I3 may be equal to or different from each other.

Returning to FIG. 6, in S104, which follows the parameter setting processing (S103), the drive control unit 51 controls the driving of the motor 10 by two-phase energization such that the detent roller 26 drives in a direction to the wall on the valley portion 211 side. At this time, the collective current Ia is controlled to become the target current I*.

In S105, the drive control unit 51 determines whether or not the driving of the motor 10 is completed. In the reference position learning, when a state in which the encoder count value Cen does not change continues for a wall contact determination time Xth or longer, the drive control unit 51 determines that the detent roller 26 is in contact with the wall P, and that the motor 10 has completed driving. Also, the encoder count value Cen at this time is used as a reference position for learning. By turning off the power supply to the motor 10, the detent roller 26 returns to the lowest position of the valley portion 211 by the spring force of the detent spring 25. Further, a return energization process may be performed to return the detent roller 26 to the lowest position of the valley portion 211. When the drive control unit 51 determines that the driving of the motor 10 has not been completed (S105: NO), the process returns to S103. When the drive control unit 51 determines that the driving of the motor 10 has been completed (S105: YES), the motor driving processing is terminated.

Figure 9:
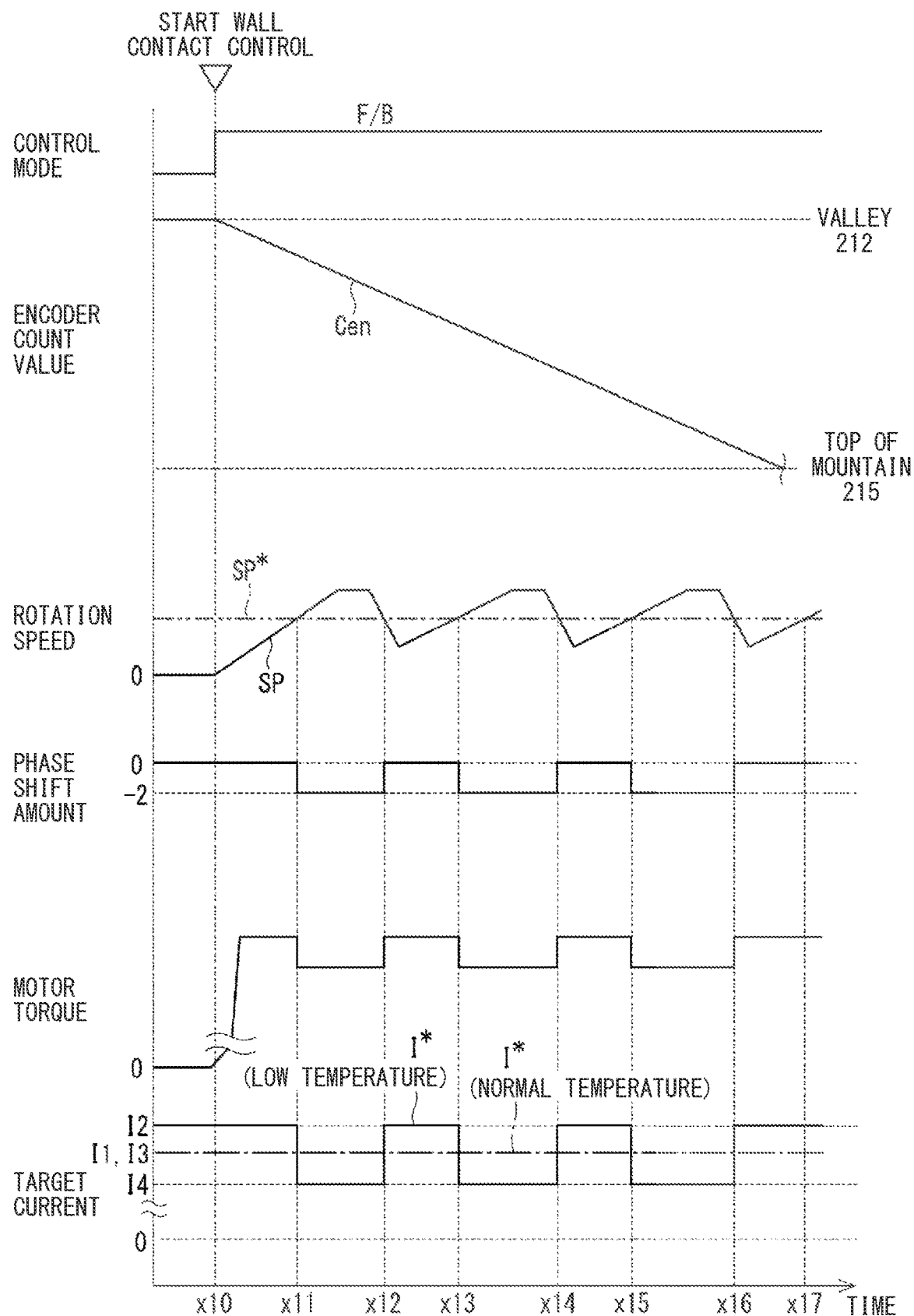
FIG. 9 is a time chart showing motor drive processing according to the first embodiment.

The motor driving processing of the present embodiment will be described with reference to a time chart of FIG. 9, and a motor driving processing of a reference example will be described with reference to a time chart of FIG. 14. Here, it is assumed that the detent roller 26 is in the valley portion 212 and the wall contact is performed on the valley portion 211 side, and the actuator temperature tact is lower than the low temperature determination value thr. In each FIGS. 9 and 14, the values, from the top, indicate the control mode, the encoder count value, the rotation speed of the motor 10, the phase shift amount, the motor torque, and the target current. The same applies to the time chart according to the embodiment described later. In FIG. 9, the target current I* at low temperature is indicated by a solid line, and the target current I* at normal temperature is indicated by a dash-dot line.

Figure 14:
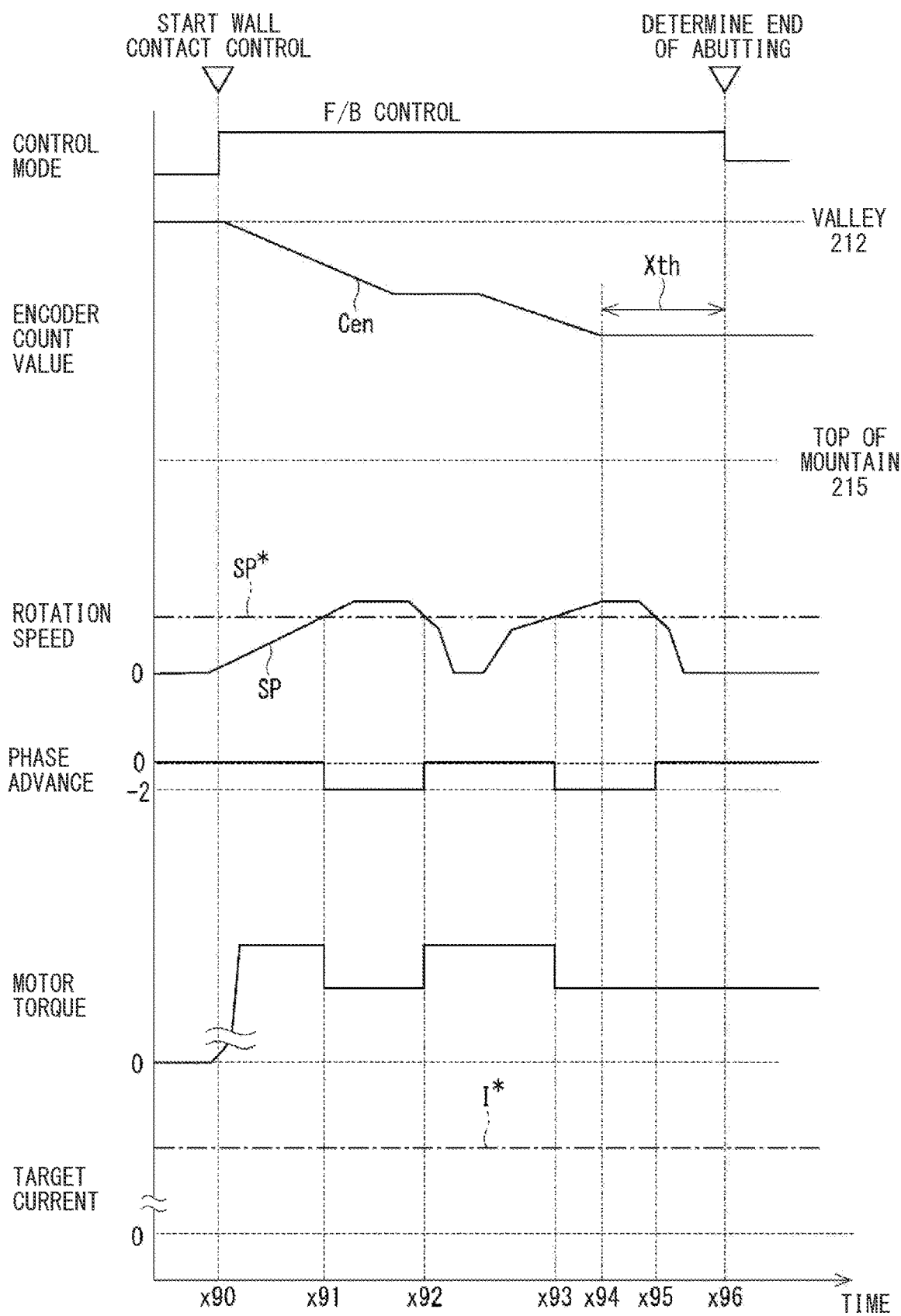
FIG. 14 is a time chart showing motor drive processing according to a reference example.

As shown in FIG. 14, at time x90, the control mode is switched from the standby mode to the feedback mode, and the wall contact control is started. In the feedback control, the drive of the motor 10 is controlled by the two-phase drive based on the encoder count value Cen. Time x90 to time x91, time x92 to time x93, and time x95 to time x96 when the motor speed SP is lower than the target speed SP* are acceleration request times, and time x91 to time x92, and time x93 to time x95 when the motor speed SP is equal to or higher than the target speed SP* are deceleration request times.

As in the reference example, when the target current I* is kept constant at low temperature, it is difficult for the motor speed to increase during acceleration due to the influence of friction, and the brake will be applied too much during deceleration. Therefore, at time x94, when the motor torque and the load torque are balanced, the motor 10 stops. Further, at time x96 when the wall contact determination time Xth elapses from time x94 when the motor 10 is stopped, it is erroneously determined that the detent roller 26 has reached the wall portion on the valley portion 211 side although the detent roller 26 is located closer to the valley portion 212 than the mountain portion 215. That is, there is a possibility that the reference position learning will be erroneous. It is assumed that the target current I* is set to a value that allows wall contact control over the mountain portion 215 at normal temperature.

In the present embodiment, as shown in FIG. 9, when the wall contact control is started at time x10, the drive mode is set to the feedback mode, and the motor 10 is driven by two-phase energization. Time x10 to time x11, time x12 to time x13, time x14 to time x15, and time x16 to time x17 when the motor speed SP is lower than the target speed SP* are acceleration request times, and time x11 to time x12, time x13 to time x14, and time x15 to time x16 when the motor speed SP is equal to or higher than the target speed SP* are deceleration request times.

When acceleration is requested, the target current I* is set to the low temperature acceleration target value I2 which is larger than the normal temperature acceleration target value I1, and when deceleration is requested, the target current I* is set to the low temperature deceleration target 14 which is smaller than the normal temperature deceleration target value I3. By increasing the target current I* during acceleration from that at normal temperature, the drive torque is increased. By decreasing the target current I* during deceleration from that at normal temperature, the brake torque is reduced to prevent excessive braking. As a result, it is possible to shift to the next acceleration control while the inertial force of the motor 10 remains.

As a result, the detent roller 26 can pass through a position where the motor torque tends to drop near the switching timing of the energization phase in the two-phase energization, and thereby it is possible to prevent stagnation at the position. Therefore, at low temperature, in the state where the detent roller 26 is in the valley portion 212 and in the wall contact control to the valley portion 211 side, the stagnation does not occur on the way to the mountain portion 215, and the reference position can be appropriately learned. When the mountain portion 215 is overcome, the detent roller 26 is driven toward the valley portion 211 by the spring force of the detent spring 25, and stagnation due to insufficient torque does not occur. In FIG. 9 and the like, the description after passing over the mountain portion 215 is omitted.

At normal temperature, the target current I* is set to the normal temperature acceleration target value I1 and the normal temperature deceleration target value I3, so that torque is not increased during acceleration and brake torque is not suppressed during deceleration. As a result, it is possible to prevent deterioration in durability in the wall contact control due to unnecessary increase in torque at normal temperature.

As described above, the shift range control device 40 controls the drive of the motor 10 including the motor winding 11, and the ECU 50 includes the drive control unit 51 and the parameter setting unit 55. The drive control unit 51 controls driving of the motor 10. The parameter setting unit 55 sets the control parameter related to drive control of the motor 10 so that at least one of the motor torque and the motor speed is variable according to the system temperature thsys. Thereby, the driving of the motor 10 can be appropriately controlled according to the system temperature thsys.

The parameter setting unit 55 sets the control parameters such that the brake torque at the time of requesting deceleration becomes smaller than that at normal temperature when the system temperature thsys is determined to be low temperature. Specifically, the control parameter in the present embodiment is the target current I*, and the parameter setting unit 55 causes the target current I* at the time of deceleration request smaller than that at normal temperature when the low temperature is determined. In the present embodiment, the brake torque is reduced by reducing the target current I* when the deceleration is requested when the low temperature is determined. As a result, it is possible to prevent the motor 10 from stopping at an unintended location due to sudden deceleration of the motor 10 when deceleration is requested, and the motor 10 can be appropriately continued to be driven.

The parameter setting unit 55 sets the control parameters such that the drive torque at the time of requesting acceleration becomes larger than that at normal temperature when the system temperature thsys is determined to be low temperature. Specifically, the control parameter in the present embodiment is the target current I*, and the parameter setting unit 55 causes the target current I* at the time of acceleration request larger than that at normal temperature when the low temperature is determined. In the present embodiment, the drive torque is increased by increasing the target current I* when the acceleration is requested when the low temperature is determined. As a result, by increasing the drive torque during acceleration and passing the motor angle where the torque tends to drop with inertia, the configuration can prevent the detent roller 26 from stopping at an unintended position, and the drive of the motor 10 can be appropriately continued.

The shift range control device 40 is applied to the shift-by-wire system 1. In the learning process, in which the P wall position is learned by the contact to the P wall as the drive limit position of the motor 10, the parameter setting unit 55 sets the control parameter, without using information related to the position of the output shaft 15 to which the rotation of the motor 10 is transmitted, according to the system temperature thsys when the motor 10 is driven by switching the energization phases with the constant number (two phases in the present embodiment).

The information related to the position of the output shaft 15 is, for example, a detection value of the output shaft sensor. When the detection value of the output shaft sensor is not used, the ECU 50 cannot determine which of the valley portions 211 and 212 the detent roller 26 is in when the start switch is turned on. From this state, when performing the learning process, there is a possibility that the mountain portion 215 may be overcome.

Moreover, it is preferable that the learning process is performed at low speed and low torque from the viewpoint of durability. On the other hand, when the motor 10 is driven at low speed and low torque, the motor may be stopped due to the two-phase drive that tends to cause a drop in torque near the angle at which the energized phase is switched, an increase in sliding deterioration due to low temperature, and the like. Thus, there is a possibility that the motor 10 cannot be restarted after the motor 10 is stopped due to insufficient torque, and the detent roller 26 cannot overcome the mountain portion 215.

Therefore, in the present embodiment, when the learning process is performed by two-phase energization, both durability and motor controllability can be achieved by setting the control parameter according to the system temperature thsys.

Second Embodiment

Figure 10:
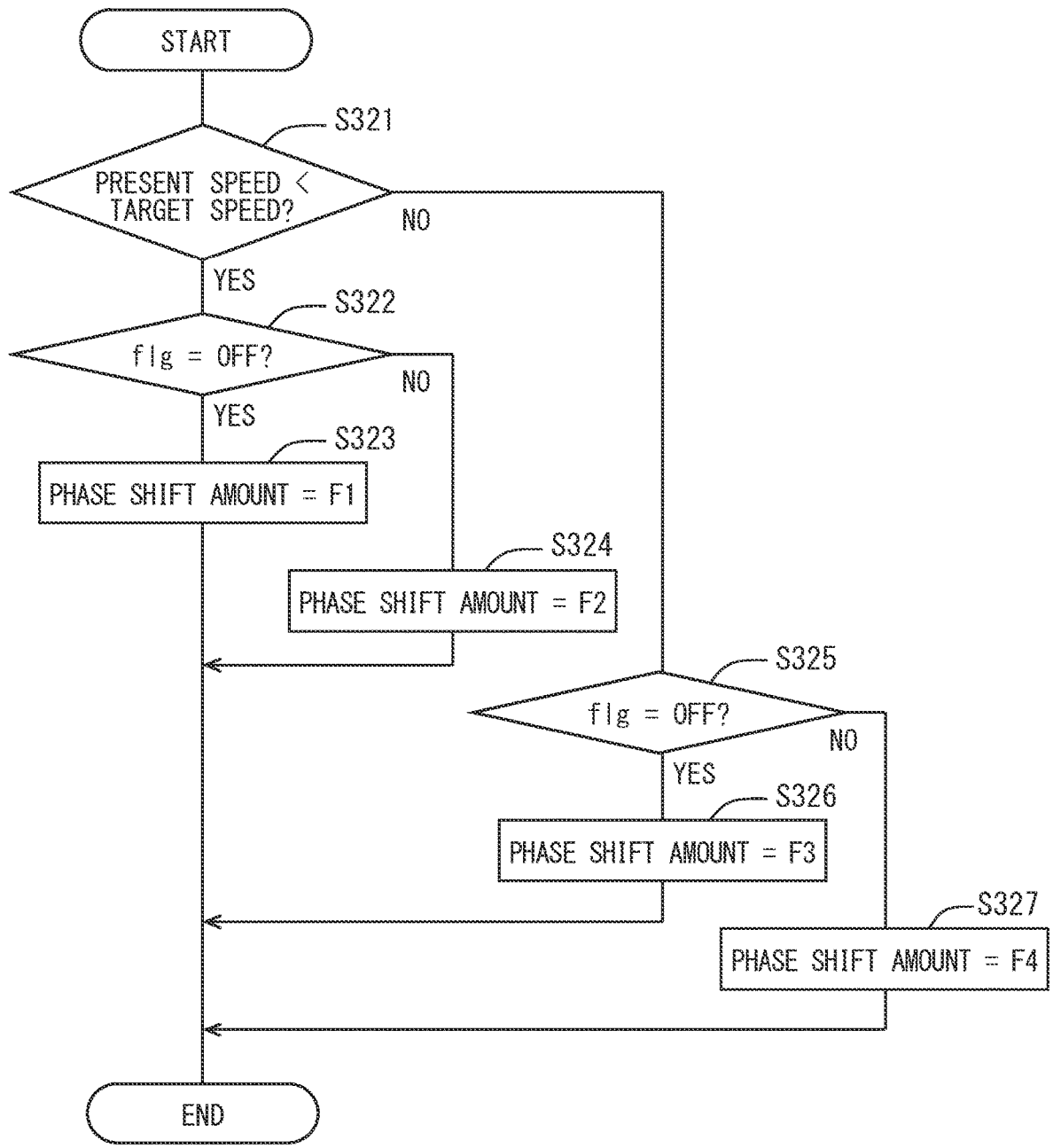
FIG. 10 is flowchart showing parameter setting processing according to a second embodiment.
Figure 11:
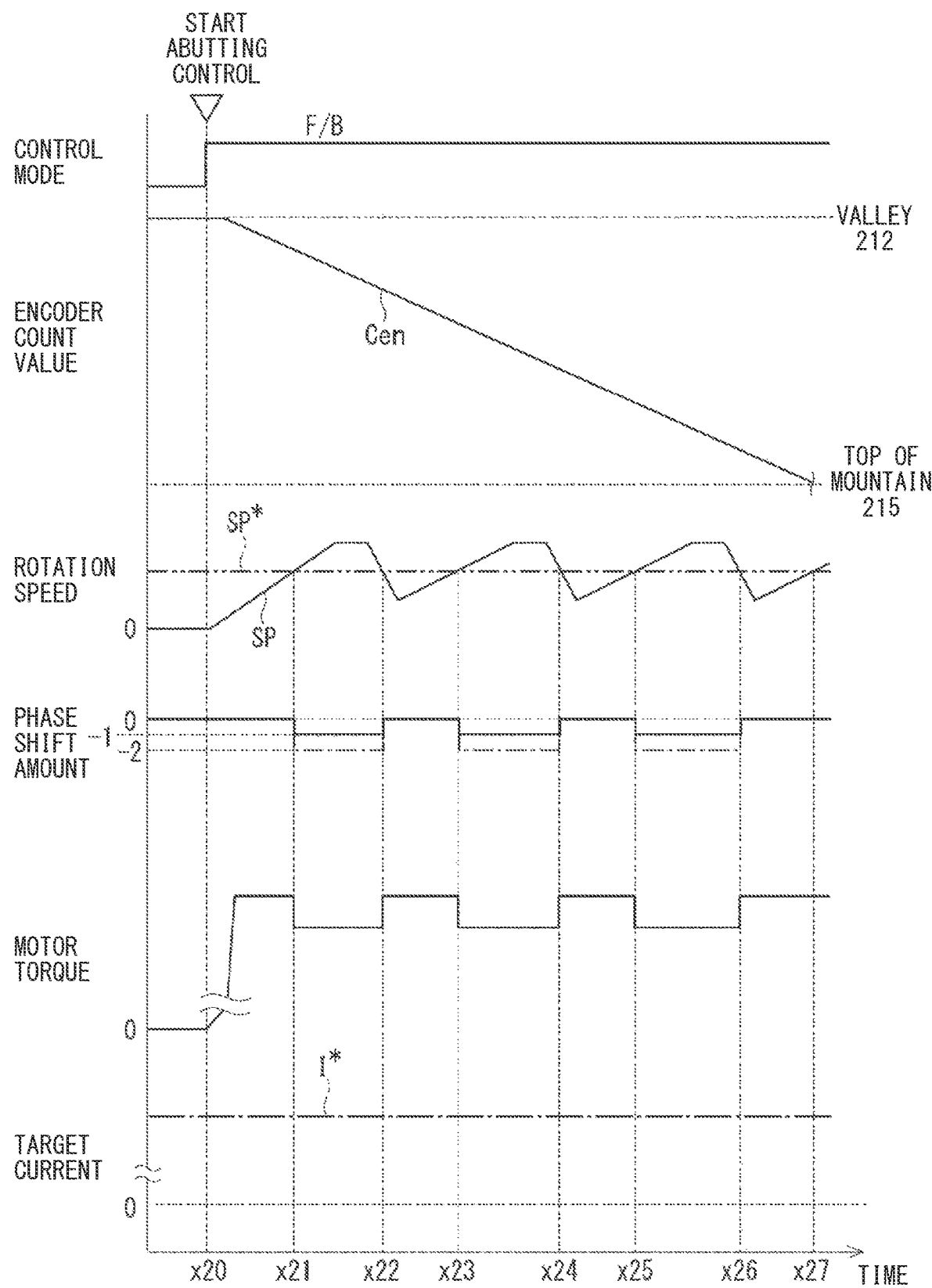
FIG. 11 is a time chart showing motor drive processing according to the second embodiment.

A second embodiment is shown in FIGS. 10 and 11. In the present embodiment, the parameter setting processing is different from that of the above embodiment, and the phase shift amount is changed as the control parameter. The phase shift amount is defined as an advance amount when the value is positive, a retardation amount when the value is negative, and an absolute value as the shift width from the reference value. In the present embodiment, the drive torque is increased at a low temperature by increasing the advance amount during acceleration more than at the normal temperature. Also, at the low temperature, the retardation amount during deceleration is made smaller than that at the normal temperature, thereby lowering the braking torque and preventing excessive braking.

The parameter change processing will be described with reference to a flowchart of FIG. 10. The processing in S321 and S322 is the same as the processing in S301 and S302 in FIG. 8. When acceleration is requested and it is determined that the low temperature flag flg is off (S322: YES), that is, at the normal temperature, the process proceeds to S323, and the phase shift amount is set to a normal temperature acceleration advance amount F1 (for example, 0). When it is determined that the low temperature flag flg is ON (S322: NO), the process proceeds to S324, and the phase shift amount is set to a low temperature acceleration advance amount F2 (for example, +1). It should be noted that the processes of S321 to S324 may be omitted when the advance amount at the time of acceleration request is not changed depending on the temperature.

The process of S325 to which proceeds when the deceleration is requested (S321: NO) is the same as the process of S305 in FIG. 8. When it is determined that the low temperature flag flg is Off (S325: YES), that is it is in normal temperature, the process proceeds to S326, and in S326, the phase shift amount is set to a normal temperature deceleration retardation amount F3 (for example, −2). When it is determined that the low temperature flag flg is ON (S325: NO), the phase shift amount is set to a low temperature deceleration retardation amount F4 (for example, −1).

FIG. 11 shows the motor drive processing according to the present embodiment. In the time chart, an example will be described in which the advance amount is set to 0 during acceleration regardless of whether the temperature is normal or low. In FIG. 11, the phase shift amount at low temperature is indicated by a solid line, and the phase shift amount at normal temperature is indicated by a dash-dot line.

When the wall contact control is started at time x20, the drive mode is set to the feedback mode, and the motor 10 is driven by the two-phase energization. Time x20 to time x21, time x22 to time x23, time x24 to time x25, and time x26 to time x27 when the motor speed SP is lower than the target speed SP* are acceleration request times, and time x21 to time x22, time x23 to time x24, and time x25 to time x26 when the motor speed SP is equal to or higher than the target speed SP* are deceleration request times.

In the present embodiment, when deceleration is requested, the retardation amount at low temperature is set smaller than that at normal temperature. As a result, by preventing the brake from being applied too much, it is possible to shift to the next acceleration control while leaving the inertial force of the motor 10, and there is no stagnation on the way to the mountain portion 215, so that the reference position learning can be appropriately performed.

In the present embodiment, the control parameter is the retardation amount, and the parameter setting unit 55 causes the retardation amount when deceleration is requested to be smaller than the retardation amount at normal temperature when it is determined that the temperature is low. In the present embodiment, the brake torque is reduced by reducing the retardation amount when deceleration is requested. As a result, it is possible to prevent the motor 10 from stopping at an unintended location due to sudden deceleration of the motor 10 when deceleration is requested, and the motor 10 can be appropriately continued to be driven.

Further, the control parameter is the advance amount, and when it is determined that the temperature is low, the parameter setting unit 55 causes the advance amount when acceleration is requested to be larger than the advance amount at normal temperature. In the present embodiment, the drive torque is increased by increasing the advance amount when acceleration is requested. As a result, by increasing the drive torque during acceleration and passing the motor angle where the torque tends to drop with inertia, the configuration can prevent the detent roller 26 from stopping at an unintended position, and the drive of the motor 10 can be appropriately continued. In addition, the same effects as those of the embodiment described above can be obtained.

Third Embodiment

Figure 12:
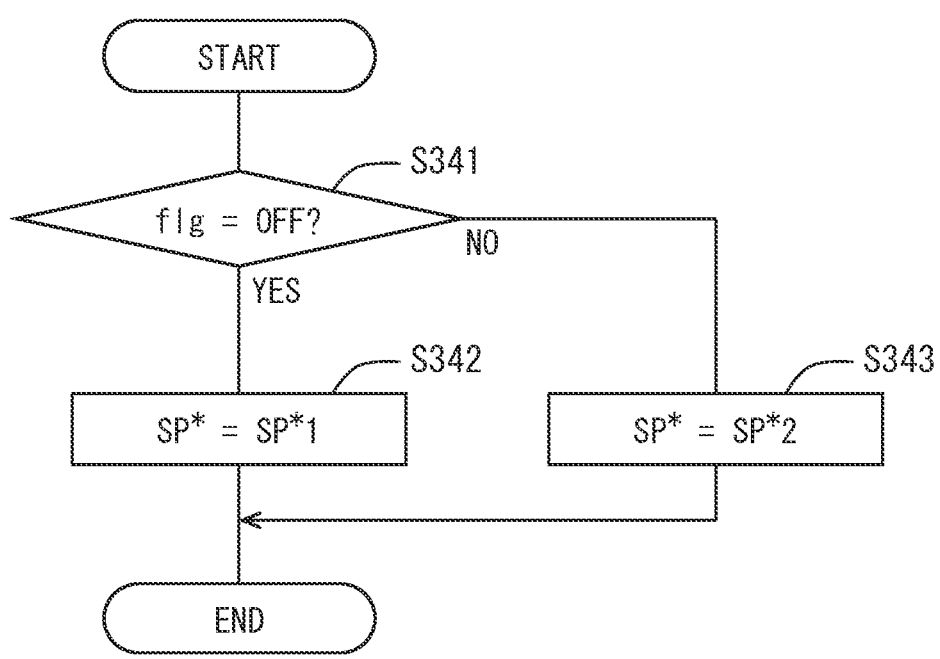
FIG. 12 is flowchart showing parameter setting processing according to a third embodiment.
Figure 13:
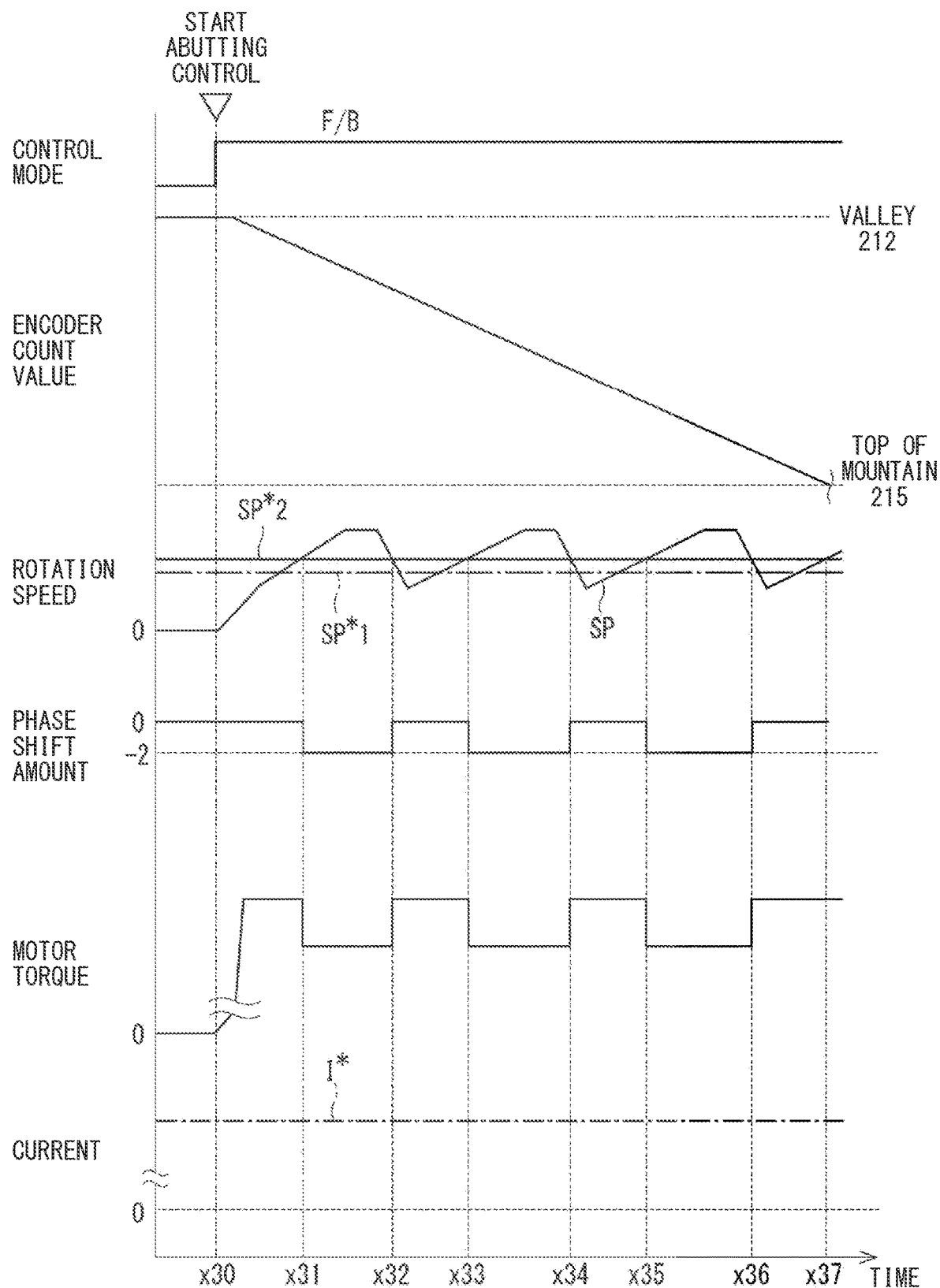
FIG. 13 is a time chart showing motor drive processing according to the third embodiment.

A third embodiment is shown in FIGS. 12 and 13. In the present embodiment, the parameter setting processing is different from that of the above embodiments, and the target speed SP* is changed as the control parameter. At low temperature, the target speed SP* is caused to be larger than at normal temperature such that the motor speed SP is approximately the same as at normal temperature.

The parameter change processing will be described with reference to a flowchart of FIG. 12. S341 is the same process as the process of S302 in FIG. 8. In S341, when it is determined that the low temperature flag flg is off (S341:

YES), the process proceeds to S342. In S342, the target speed SP* is set to the normal temperature target speed SP*1 (for example, 300 [rpm]). When it is determined that the low temperature flag flg is ON (S341: NO), the process proceeds to S343, and the target speed SP* is set to the low temperature target speed SP*2 (for example, 350 [rpm]).

FIG. 13 shows the motor drive processing according to the present embodiment. The drive mode is the feedback mode, and the motor 10 is driven by the two-phase energization. Time x30 to time x31, time x32 to time x33, time x34 to time x35, and time x36 to time x37 are acceleration request times, and time x31 to time x32, time x33 to time x34, time x35 to time x36 are deceleration request times.

When the wall contact control is started at time x30, the drive mode is set to the feedback mode, and the motor 10 is driven by the two-phase energization. In the present embodiment, the target speed SP*2 at low temperature is higher than the target speed SP*1 at normal temperature, so that the motor speed SP is equal to that at normal temperature. By increasing the motor speed SP, the time until the motor speed SP becomes 0 when deceleration is requested becomes longer. Thus, it is possible to shift to the next acceleration control while leaving the inertial force of the motor 10, and there is no stagnation on the way to the mountain portion 215, so that the reference position learning can be appropriately performed.

In the present embodiment, the control parameter is the target speed SP* of the motor 10, and when it is determined that the system temperature thsys is low, the parameter setting unit 55 sets the target speed SP* higher than the target speed SP* at room temperature. As a result, by passing the motor angle where the torque tends to drop with inertia, the configuration can prevent the detent roller 26 from stopping at an unintended position, and the drive of the motor 10 can be appropriately continued. In addition, the same effects as those of the embodiment described above can be obtained.

In the embodiment, the shift-by-wire system 1 corresponds to a "power transmission switching system", the shift range control device 40 corresponds to a "motor control device", and the shift-by-wire ECU 50 corresponds to a "control unit". Here, the power transmission switching system is a shift range switching system, but in a broader sense, the power transmission switching system may be a system for switching power transmission states including switching of a driving source in a hybrid vehicle.

Other Embodiments

When the temperature is low, the target current is changed as the control parameter in the first embodiment, the phase shift amount, which is the amount of retardation and advance, is changed as the control parameter in the second embodiment, and the target speed is changed in the third embodiment. In other embodiments, multiple embodiments may be combined. For example, when the temperature is low, the target current, the phase shift amount, and the target speed may all be changed. Also, a control parameter other than the target current, the phase shift amount, and the target speed may be changed.

In the above embodiment, the control parameter is changed when the temperature is low in the reference position learning in the two-phase energization. In other embodiments, reference position learning may be other energization patterns, such as one-phase energization. Alternatively, based on the detection value of the output shaft sensor, the control parameter may not be changed depending on the temperature when the reference position is learned by wall contact to the side where it is not necessary to overcome the mountain portion, and the control parameter may be changed when the temperature is low in a case where the detection value of the output shaft sensor is not available, such as in a case where the output shaft sensor is abnormal. Furthermore, the control parameter may be changed in a case where the temperature is low when the motor is driven other than in the reference position learning.

In the above embodiments, the motor is a switched reluctance motor. In another embodiment, as the motor, for example, a motor except for the switched reluctance motor, such as a DC brushless motor, may be used, and the number of magnetic poles and the like can be set arbitrarily.

In the above embodiments, the rotational position sensor is an encoder. In another embodiment, a sensor except for the encoder, such as a resolver, may be used as the rotational position sensor. According to the above embodiments, two recess portions are formed in the detent plate. In another embodiment, the number of recesses portions is not limited to two, and for example, a recess portion may be provided for each range. The shift range switching mechanism, the parking lock mechanism, and the like may be different from those of the above embodiments.

In the embodiments described above, the speed reducer is provided between the motor shaft and the output shaft. Although the detail of the speed reducer is not mentioned in the above-described embodiments, the speed reducer may have any configuration, such as one using a cycloid gear, a planetary gear, or a spur gear that transmits a torque from a speed reduction mechanism substantially coaxial with the motor shaft to the drive shaft, and one using these gears in combination. As another embodiment, the speed reducer between the motor shaft and the output shaft may be omitted, or a mechanism other than the speed reducer may be provided. In the above embodiments, the motor control device is applied to a shift range switching system. In another embodiment, the motor control device may be applied to a device except for the shift range switching system.

The control unit and the technique according to the present disclosure may be achieved by a dedicated computer provided by constituting a processor and a memory programmed to execute one or more functions embodied by a computer program. Alternatively, the control circuit and the method described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. As described above, the present disclosure is not limited to the embodiments described above, and can be implemented in various forms without departing from the spirit of the present disclosure.

The present disclosure has been described in accordance with the embodiments. However, the present disclosure is not limited to such embodiments and structures. The present disclosure also encompasses various modifications and variations within the scope of equivalents. Furthermore, various combination and formation, and other combination and formation including one, more than one or less than one element may be made in the present disclosure.

What is claimed is:

1. A motor control device configured to control a driving of a motor having a motor winding, the motor control device comprising:
   a motor control unit configured to control the driving of the motor; and
   a parameter setting unit configured to set a control parameter related to a driving control of the motor such that at least one of a motor torque and a motor speed is variable according to a system temperature, wherein,
   in a case where the motor control unit controls the driving of the motor to maintain a rotation speed by alternating an acceleration control and a deceleration control,
      when it is determined that the system temperature is normal, the parameter setting unit sets the control parameter to a parameter for a normal temperature in order not to suppress a brake torque, and
      when it is determined that the system temperature is low, the parameter setting unit sets the control parameter such that the brake torque when deceleration is requested is smaller than the brake torque at the normal temperature.

2. The motor control device according to claim 1, wherein the control parameter is a target current, and
when it is determined that the system temperature is low, the parameter setting unit causes the target current when the deceleration is requested to be smaller than the target current at the normal temperature.

3. The motor control device according to claim 1, wherein the control parameter is a retardation amount, and
when it is determined that the system temperature is low, the parameter setting unit causes the retardation amount when the deceleration is requested to be smaller than the retardation amount at the normal temperature.

4. The motor control device according to claim 1, wherein
when it is determined that the system temperature is low, the parameter setting unit sets the control parameter such that a drive torque when acceleration is requested is larger than a drive torque at the normal temperature.

5. The motor control device according to claim 4, wherein the control parameter is a target current, and
when it is determined that the system temperature is low, the parameter setting unit causes the target current when the acceleration is requested to be larger than the target current at the normal temperature.

6. The motor control device according to claim 4, wherein the control parameter is an advance amount, and
when it is determined that the system temperature is low, the parameter setting unit causes the advance amount when the acceleration is requested to be larger than the advance amount at the normal temperature.

7. The motor control device according to claim 1, wherein the control parameter is a target speed of the motor, and
when it is determined that the system temperature is low, the parameter setting unit causes the target speed to be larger than the target speed at the normal temperature.

8. The motor control device according to claim 1, wherein the motor control device is applied to a power transmission switching system, and
in a learning process in which a drive limit position of the motor is learned, the parameter setting unit sets the control parameter, without using information related to a position of an output shaft to which rotation of the motor is transmitted, according to the system temperature when the motor is driven by switching energization phases with a constant number.

9. A motor control device comprising
at least one processor configured to:
   control a driving of a motor having a motor winding; and
   set a control parameter related to the driving of the motor such that at least one of a motor torque and a motor speed is changed according to a system temperature, wherein,
   in a case where the at least one processor controls the driving of the motor to maintain a rotation speed by alternating an acceleration control and a deceleration control,
      when determining that the system temperature is normal, the at least one processor sets the control parameter to a parameter for a normal temperature in order not to suppress a brake torque, and
      when determining that the system temperature is low, the at least one processor sets the control parameter such that the brake torque when deceleration is requested is smaller than the brake torque at the normal temperature.

* * * * *